United States Patent [19]
Naka et al.

[11] Patent Number: 5,870,644
[45] Date of Patent: Feb. 9, 1999

[54] PHOTOGRAPHIC CAMERA WHICH AUTOMATICALLY SETS FILM STATUS INDICATION AND CLOSES LIGHT LOCK DOOR

[75] Inventors: Yoji Naka; Takashi Kamoda, both of Saitama, Japan

[73] Assignee: Fuji Photo Film Co., Ltd., Kanagawa, Japan

[21] Appl. No.: 813,685

[22] Filed: Mar. 7, 1997

[51] Int. Cl.⁶ .............................. G03B 17/26; G03B 17/02
[52] U.S. Cl. ....................... 396/512; 396/513; 396/515; 396/536; 396/538
[58] Field of Search .................................. 396/512, 513, 396/514, 515, 516, 518, 522, 538, 536

[56] References Cited

U.S. PATENT DOCUMENTS

| | | | |
|---|---|---|---|
| 5,555,057 | 9/1996 | DiRisio | 396/516 |
| 5,664,248 | 9/1997 | Naka et al. | 396/513 |
| 5,717,971 | 2/1998 | Stiehler et al. | 396/513 |

*Primary Examiner*—Eddie C. Lee
*Attorney, Agent, or Firm*—Young & Thompson

[57] ABSTRACT

A camera, which is loaded with a film cartridge having a light lock door for closing and opening a film egress/ingress slot and an indicator attached to a cartridge spool for providing a visible indication that a filmstrip in the cartridge is exposed at a specific angular position of rotation of the cartridge spool, is provided, at the bottom of a cartridge chamber of the camera, with a bottom lid for opening and closing the cartridge chamber and a lock/unlock key movable between lid lock position and a lid unlock position. The movement of the lock/unlock key toward the lid unlock position is accompanied by rotation of the cartridge spool into the specific angular position and movement of the light lock door to the film egress/ingress slot closed.

23 Claims, 9 Drawing Sheets

PHOTOGRAPHIC CAMERA WHICH AUTOMATICALLY SETS FILM STATUS INDICATION AND CLOSES LIGHT LOCK DOOR

BACKGROUND OF THE INVENTION

1. Field of the Invention

This invention relates to a camera which is loaded with a film cartridge which contains a roll of film strip wound around a cartridge spool and a light lock door rotated closed to prevent ambient light from entering the cartridge interior through a film egress/ingress slot and rotated open to permit film movement into and out of the cartridge interior through the film egress/ingress slot.

2. Description of Related Art

In recent years, a new type of film cartridges have been proposed and have been put in the market. Such a film cartridge has a film egress/ingress slot and is provided with a light lock door rotatable between a closed position in which the cartridge interior where substantially the entire length of film strip wound around the cartridge spool is contained is kept light-tight and an open position in which the filmstrip is permitted to move into and out of the cartridge interior through the film egress/ingress slot. One of this type of film cartridges is known from, for example, U.S. Pat. No. 5,025,274. The film cartridge shell at one of its ends has at least two different symbol windows in the shapes of, for example, a circle (○) and a cross (X). The circular-shaped symbol window effects an indication that the filmstrip is unexposed, and the cross-shaped symbol window effects an indication that the filmstrip is exposed. An indicator rotatable together with the cartridge spool on the inside of the film cartridge is visible in different color from the cartridge shell in one specific angular position through the circular-shaped symbol window to provide an indication that the filmstrip is unexposed. The indicator is visible in different color in another specific angular position through the cross-shaped symbol window to provide an indication that the filmstrip is exposed.

Various types of cameras have been proposed for use with this type of film cartridges. This type of camera has a camera body provided with a cartridge chamber for receiving a film cartridge (which is hereafter referred to as a cartridge receiving chamber) therein. The cartridge receiving chamber at one of its ends has an opening through which is opened to permit a film cartridge to be loaded into and taken out of the cartridge receiving chamber and which is closed by a lid locked in a locked position by a locking key. The camera is further provided with a rotational spool driver which is brought into engagement with the cartridge spool when the film cartridge is inserted into the cartridge receiving chamber and rotates the cartridge spool in opposite directions to forcibly move the filmstrip into and out of the cartridge interior through a film egress/ingress slot, and a light lock door driver which is brought into engagement with the cartridge spool when the film cartridge is inserted into the cartridge receiving chamber and rotates the light lock door in opposite directions to open and close the film egress/ingress slot.

Low-priced cameras of this type has a film rewind switch which is turned on to rotate a motor-driven spool driver for causing rotation of the cartridge spool to rewind an exposed filmstrip into the film cartridge and turned off when an exposure counter indicates zero. The cartridge spool of such a camera is not always located in a fixed position when the rewind switch is turned off, and consequently, the indicator of the film cartridge is not always precisely in a fixed angular position relative to the symbol window which effects an indication that the filmstrip has been exposed. Accordingly, there is a necessity for the photographer to make an additional rotation of the indicator to adjust the indicator in position relative to the symbol window prior to taking the film cartridge out of the camera. Specifically, in this type of low-priced camera, the motor-driven spool driver has a spool drive shaft with a key engageable with a key way of the cartridge spool. Because the angular position of the key way is precisely specified with respect to the spool driver shaft, the spool driver has to be rotated for precise angular position adjustment of the indicator relative to the symbol window prior to taking the film cartridge out of the camera. Another necessity encountered by the photographer is to operate the light lock door driver to rotate the light lock door open to permit film movement into and out of the film cartridge prior to loading the film cartridge into the camera and to rotate it closed prior to taking the film cartridge from the camera for prevention of ambient light from entering the cartridge after permit film movement into and out of the film cartridge after taking the film cartridge out of the camera.

It is hard in the economical point of view to built a motor drive mechanism for both angular position adjustment of the indicator and operation of the light lock door in the low-priced camera.

SUMMARY OF THE INVENTION

It is an object of the invention to provide a camera, for use with a film cartridge having an indicator operationally related to the cartridge spool for providing an indication visible outside of the film cartridge that the filmstrip is exposed and having a light lock door built-in therein for opening and closing a film egress/ingress slot of the film cartridge, which has a necessity of only a simple mechanism for positioning the indication at a specified angular position for visible observation and bringing the light lock door into the closed position immediately before unloading the film cartridge from the camera.

The foregoing object of the invention is accomplished by providing a camera, for use with a film cartridge which has a roll of filmstrip wound around a cartridge spool, an indicator operationally related to the cartridge spool for providing an indication that the filmstrip is exposed visible from the exterior of the film cartridge when the cartridge spool is at a specified angular position of rotation, and a light lock door built-in the film cartridge for opening and closing a film egress/ingress slot of the film cartridge, which has a cartridge receiving chamber formed with an opening through which the film cartridge is taken in and out of the cartridge receiving chamber, a bottom lid for opening and closing the bottom opening of the cartridge chamber, lock/unlock means for locking the bottom lid in closed position and unlocking the bottom lid, and light lock door drive means for driving the light lock door to open and close the film egress/ingress slot of the film cartridge. The camera is provided with positioning means and a drive mechanism, both of which are mechanically linked with the lock/unlock means. The positioning means positions the spool drive means in a specified angular position of rotation corresponding to the specified angular position of rotation of the cartridge spool following movement of the lock/unlock means from the lock position toward the unlock position. The drive mechanism causes the light lock door drive means to drive the light lock door to the closed position following the movement of the lock/unlock means from the lock position toward the unlock position.

The positioning means may be so constructed as to drive the spool drive means in such a direction as to cause rotation of the cartridge spool in the film winding direction to the specified angular position of rotation at the beginning of the movement of the lock/unlock means from the lock position toward the unlock position, when the spool drive means is out of the specified angular position of rotation. Further, the positioning means may include a link mechanism mechanically linking the lock/unlock means and the spool drive means together so as to transmit drive force from the lock/unlock means to the spool drive means only when the spool drive means is out of the specified angular position of rotation.

Specifically, the positioning means comprises a pair of drive and driven partial gears, each partial gear being formed with a partial toothless section. The driven partial gear places the toothless section thereof in a position to face the drive partial gear when the spool drive means is in the specified angular position of rotation, and the drive partial gear places the toothless section thereof to face the driven partial gear when the lock/unlock means is in the lock position and in the unlock position. In this instance, the drive partial gear has the number of teeth greater than the driven partial gear, and further has the number of teeth cut away therefrom greater than the number of teeth cut away from the driven partial gear. The positioning means has a gear coaxially attached to and rotating together with the driven partial gear. This gear functions as a planet gear of a planetary gear mechanism which includes a gear driven by the planet gear as the sun gear thereof. This sun gear is coaxially secured to a spool drive shaft of the spool drive means. The gear ratio between the sun gear and the planet gear is preferably 1:1. In a preferred embodiment, these drive and driven partial gears are arranged such that the driven partial gear is biased against the drive partial gear and is coerced to rotate in such a direction as to effect an unrestricted easy-biting against the drive partial gear following the movement of the lock/unlock means from the lock position toward the unlock position. The sun gear and the drive and driven partial gears are laid out in a such a relative position as that, in the event that the drive partial gear drives the driven partial gear, when leading tooth tops of the drive partial gear and the driven partial gear strike against each other, the driven partial gear is forced back along the sun gear by the drive partial gear and then comes into appropriate mesh with the drive partial gear.

Furthermore, in a preferred embodiment of the invention, the positioning means may comprises a carrier lever coaxially mounted for rotation on the spool drive shaft, which carrier lever supports the planet gear for rotation at one of ends thereof and has an elastic arm at its another end which is subjected to bending stress to urge the carrier lever so as to press the driven partial gear against the drive partial gear.

Overrun prevention means may be provided for preventing the spool drive means from running over the specified angular position of rotation due to inertial force caused while the positioning means positions the spool drive means in the specified angular position of rotation. The overrun prevention means comprises a braked member attached to either one of the spool drive means and a rotational member, which braked member rotates always following rotation of the spool drive means, and a brake member engageable with the braked member. The brake member is preferably driven by a cam attached to either one of the lock/unlock means and the rotational member which rotates always following operation of the lock/unlock means. In a preferred embodiment, at least one of the brake member and the braked member has a sloped section. The spool drive means backs to the specified angular position of rotation through engagement between the brake member and the braked member through the sloped section, whenever the spool drive means runs over the specified angular position of rotation. The brake member may comprise a cam follower in contact with the cam and an elastic arm subjected to bending stress to press the cam follower against the cam. In this structure, the drive mechanism preferably includes toggle means having a dead point for urging the light lock door drive means alternatively toward the closed position before the dead point and toward the open position after the dead point.

The drive mechanism is preferably designed and adapted to timely start its operation after the positioning means starts a positioning operation of bringing the spool drive means into the specified angular position of rotation and before the positioning means completes the positioning operation, and cause the positioning means to timely complete its positioning operation before the toggle means reaches the dead point.

In another preferred embodiment, a drive torque transmission means is installed to transmit drive torque from the reversible motor to the spool drive means. This drive torque transmission means includes a planetary gear mechanism, and a pair of idle gears selectively brought into linkage with the planetary gear mechanism. The planetary gear mechanism has a sun gear driven by the reversible motor, and a pair of planet gears in mesh with the sun gear, one of which is brought into mesh with one of the idle gears through rotation of the sun gear when the reversible motor is changed in rotational direction to a normal direction in which the reversible motor drives the cartridge spool in the film unwinding direction, and another of which is brought into mesh with another idle gear through rotation of the sun gear when the reversible motor is changed in rotational direction to the reverse direction in which the reversible motor drives the cartridge spool in the film unwinding direction. When the one planet gear and the one planet gear remain in mesh at the beginning of the movement of the lock/unlock means from the lock position toward the unlock position, the one planet gear and the one planet gear are forcibly separated from each other.

In a preferred embodiment, an unlock prevention mechanism may be installed to prevent movement of the lock/unlock means from the lock position toward the unlock position while the reversible motor rotates in the reverse direction to wind a filmstrip into the film cartridge.

According to the invention, both positioning the spool drive means into the specified angular position of rotation and closing the light lock door through the door drive means are made following operation of the lock/unlock means toward the unlock position, without using an electric control means such as an electric control mechanism which is always expensive and somewhat complicated in structure and which is affected in reliable operation by a built-in battery. Because positioning the spool drive means into the specified angular position of rotation is always made through its rotation in the film winding direction, the filmstrip is not unwound off the cartridge spool nor allowed to comes out of the film cartridge through the film egress/ingress slot in the least. Once the spool drive means is placed in the specified angular position of rotation, it does not change in position at all even if the lock/unlock means is operated toward the unlock position. Because positioning the spool drive means into the specified angular position of rotation is accompanied by placing the driven partial gear with its toothless cutout facing the drive partial gear, the driven partial gear is not driven nor affects the spool drive means in the specified angular position of rotation consequently, even if the drive partial gear rotates after the exposed filmstrip has once been wound into the film cartridge. Further, the drive partial gear is placed with its toothless cutout facing the driven partial gear when the lock/unlock means remains in the lock position and when it remains in the unlock position, the drive partial gear does not any rotation nor transmit rotation to the lock/unlock means even if the driven partial gear rotates following rotation of the spool drive means. While it is preferred to provide both drive and driven partial gears with the same number of teeth, the drive partial gear is preferably provided with teeth of a number larger by at least one than the driven partial gear. This is because, if leading teeth of the drive and driven partial gears happen to come across at the beginning of engagement, the drive partial gear must not be ahead of the driven partial gear. The driven partial gear is allowed to make all its teeth engage with teeth of the driven partial gear one after another, and consequently prevented from a lack of rotation even when there is a demand for the maximum angle of rotation on the driven partial gear. Further, in the event where the driven partial gear rotates following rotation of the spool drive means, the drive partial gear, having the nominal number of teeth cut away therefrom greater than that of the driven partial gear, is given sufficient allowance for the waiting range within which it remains disengaged from the driven partial gear, and is easily adjustable in operation timing with respect to operation of its related members such as the light lock door drive means, which yields an increased degree of design freedom to the positioning mechanism.

If the driven partial gear is fixed, the drive partial gear is possibly no sooner brought into mesh with the driven gear than it bites at the driven partial gear and comes to a standstill, nevertheless, because the full gear coaxially attached to and rotating together with the driven partial gear functions as a planet gear of a planetary gear mechanism having a gear driven by the full gear as the sun gear thereof, the driven partial gear is forced to separate apart from the drive partial gear rolling around the sun gear in the event tooth tops of the leading teeth of the drive and driven partial gears are brought into strike against each other, these partial gears do not encounter biting each other and a standstill. In this instance, because the gear ratio between the sun gear, which is secured to the shaft of the spool drive means, and the planet gear is 1:1, the toothless cutout of the drive partial gear unconditionally corresponds in position to the specific angular position of rotation of the spool drive means which is driven through the planet gear and the sun gear.

Because, in addition to that the driven partial gear is urged against the drive partial gear, these partial gears are adapted to rotate in such opposite directions as that the driven partial gear easily bites the drive partial gear when the lock/unlock means is moved toward the lock position, rotation of the spool drive means to the specific angular position brings the drive and driven partial gears into easy engagement. Further, because of the ingenious arrangement of these partial gears and the sun gear that, when tooth tops of their leading teeth of the partial gears strike against each other, the driven partial gear 48 is forced to escape from engagement with the drive partial gear 37, and then is brought into appropriate mesh with the drive partial gear, these partial gears are prevented from encountering a standstill due to biting each other.

In another preferred embodiment, the overrun prevention means prevents an overrun of the spool drive means beyond the specific angular position of rotation due to inertial force which possibly brings the partial gears into re-engagement with each other. The overrun prevention means comprises a braked member, attached to either one of the spool drive means and a rotational member which rotates always together with rotation of the spool drive means, and a brake member engageable with the braked member. The brake member may be driven by a cam attached to either one of the lock/unlock means and a rotational member capable of rotating always following with operation of the lock/unlock means so that it remains out of the circular path of the braked member while the spool drive means rotates and is brought into the circular path of the braked member following movement of the lock/unlock means toward the unlock position. Either one or both of the brake member and braked member may have a sloped section, sliding engagement between these brake member and braked member through the sloped section forces the spool drive means back to the specific angular position of rotation precisely whenever the spool drive means runs over the specific angular position of rotation. The brake member may comprise a cam follower in contact with said cam and an elastic arm, such as made of plastic, subjected to bending stress to press the cam follower against the cam.

In another preferred embodiment, the drive mechanism may include toggle means having for urging the light lock door drive means alternatively to the closed position before the toggle means goes across it dead point and to the open position after the toggle means goes across the dead point. The drive mechanism timely starts its operation after the positioning means starts its positioning operation of bringing the spool drive means into the specific angular position of rotation and before it completes the positioning operation. Further, The positioning means timely completes the positioning operation immediately before the toggle means goes across the dead point. This brings the light lock door into the closed position timely after the completion of positioning the spool drive means into the specific angular position of rotation.

In still another preferred embodiment, the camera further includes a drive torque transmission means for transmitting drive torque from the reversible motor to the spool drive means. This drive torque transmission means comprises a planetary gear mechanism, and a pair of idle gears selectively brought into linkage with the planetary gear mechanism. The planetary gear mechanism comprises a sun gear driven by the reversible motor, a pair of planet gears in mesh with the sun gear. One of these planet gears is brought into mesh with one of the idle gears through rotation of the sun gear when the reversible motor is changed in rotational direction to the normal direction from the reverse direction. Another planet gear is brought into mesh with another idle gear through rotation of the sun gear when the reversible motor is changed in rotational direction to the reverse direction from the normal direction. The drive torque transmission means further comprises a separation means for, when the one planet gear and the one idle gear remain in mesh with each other at the beginning of movement of the lock/unlock means from the lock position toward the unlock position, forcibly separating these planet and idle gears each other. The drive torque transmission means may further comprises an unlock prevention mechanism for preventing movement of the lock/unlock means from the lock position toward the unlock position while the reversible motor rotates in the reverse direction.

According to this embodiment, even if, while the camera 10 is not loaded with any film cartridge, a shutter button is operated, the one planet gear and one idle gear are forced to come out of mesh with each other, and hence the one planet gear is prevented from biting between the one idle gear and sun gear, permitting the lock/unlock means to be operated from the lock position toward the unlock position. Furthermore, the lock/unlock means is prevented from movement from the lock position toward the unlock position while the reversible motor rotates in the reverse direction, eliminating a breakdown of the spool drive means which is caused by the brake member while the spool driver is driven by the reversible motor.

BRIEF DESCRIPTION OF THE DRAWINGS

The foregoing and other objects and features of the invention will become apparent from the following description of the specific embodiments taken in conjunction with the accompanying drawings, in which.

DETAILED DESCRIPTION OF THE SPECIFIC EMBODIMENT

Figure 1:
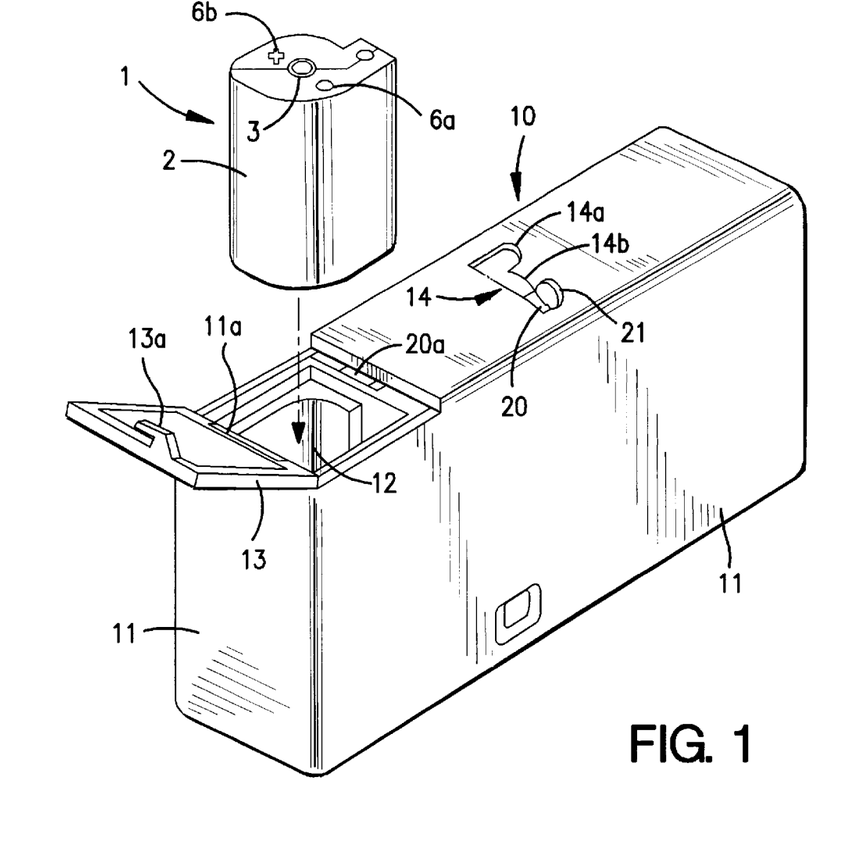
FIG. 1 is a perspective bottom view of a camera with a bottom lid open in accordance with an embodiment of the invention.
Figure 2:
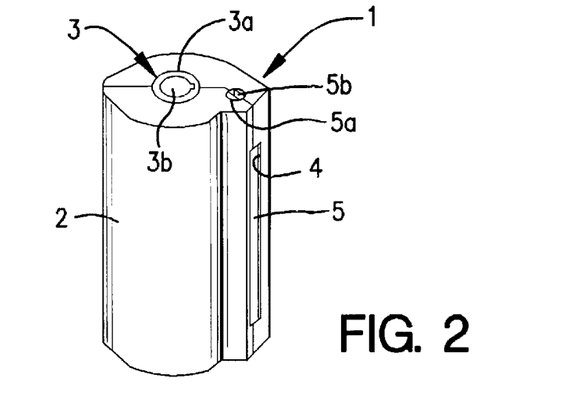
FIG. 2 is a perspective view of an advanced photo system type of film cartridge shown upside down.

Referring to the drawings in detail, in particular, to FIGS. 1 and 2, a camera 10 in accordance with an embodiment of the invention, shown upside down in FIG. 1, has a camera body 11 which is provided with a cartridge receiving chamber 12 with its bottom open for receiving a film cartridge 1 therein and a bottom lid 13 for opening and closing the bottom. The bottom lid 13 is pivotally mounted on a pivot shaft 11a at one of bottom sides of the camera body 11. As shown in FIG. 2, the film cartridge 1 comprises a plastic cartridge shell 2 made up of two mating cartridge sections and a cartridge spool 3, put in the cartridge shell 2, on which substantially the entire length of a filmstrip (not shown) is rolled up. The cartridge shell 2 is formed with a film egress/ingress slot 4 formed between the two mating half sections through which the filmstrip moves into and out of the cartridge interior. A light lock door 5, which is installed on the inside of the film egress/ingress 4 in the cartridge interior 12 and exposes at its one end 5a (at the bottom side as viewed in FIG. 1) in a recessed end portion of the film cartridge 12, is formed with a slot 5b engageable with a light lock door driver 50 (which protrudes into the cartridge receiving chamber 12 and will be described in detail later with reference to FIG. 3). The light lock door 5 is supported by the cartridge shell 2 for rotation through an angle of approximately 90° about a center line in parallel to the center line of rotation of the cartridge spool 3. The light lock door 5 is rotated by the light lock door driver 50 to open and close the film egress/ingress slot 4.

The cartridge spool 3 at one of its ends which is located adjacent to and exposes in a recessed end portion of the cartridge receiving chamber 12 of the camera 10 when the film cartridge 1 is put in the cartridge receiving chamber 12 is formed with a key way 3b engageable with a planetary gear type of motor-driven spool driver 30 (which protrudes into the cartridge receiving chamber 12 and will be described in detail later with reference to FIGS. 3 and 4). The motor-driven spool driver 30 rotates the cartridge spool 3 in opposite directions, namely a film unwinding direction and a film winding direction, to unwind the filmstrip off the cartridge spool 3 and to wind it onto the cartridge spool 3, respectively. The cartridge shell 2 at one of its ends (at the top end as viewed in FIG. 1) is formed with a circular-shaped symbol window 6a for effecting an indication that the filmstrip is unexposed and a cross-shaped symbol window 6b for effecting an indication that the filmstrip is partly exposed (partly unexposed) or completely exposed. An indicator (not shown), which has a color different from the film cartridge shell 2, is installed on the inside of the end wall formed the symbol windows in the cartridge shell 2. The indicator is rotatable together with the cartridge spool 3 and shows a color indication visible through the circle-shaped symbol window 6a in a specific angular position and a color indication visible through the cross-shaped symbol window 6b in another specific angular position. These specific angular positions are at predetermined circumpherential distances from the position of the key way 3b of the cartridge spool 3. When the film cartridge 1 is taken out of the cartridge receiving chamber 12 of the camera 10, the cartridge spool 3 is forcibly rotated to locate the indicator in the specific angular position for providing an indication through the cross-shaped symbol window 6b mechanically following unlocking movement of a bottom lid release lever 20 (see FIG. 3) by means of which the bottom lid 13 is opened.

The bottom lid lock/unlock lever 20 pivoted on a pivot shaft 22 has a tongue 20a and a foldable release arm 21 in a position opposite to the tongue 20a with respect to the pivot shaft 22. For direct access to the folded release arm 21 the camera body 11 is formed with a generally L-shaped opening 14 in the bottom wall. Specifically, the L-shaped opening 14 comprises a relatively wide arm opening 14a for receiving the folded release arm 21 and a slightly curved thin stem slot 14b joined to the arm opening 14a for permitting movement of the release arm 21 up and down as viewed in FIG. 1. The release arm 21 is in the arm opening 14a while the bottom lid lock/unlock lever 20 locks the bottom lid 13 and is in approximately the extreme end portion of the stem slot 14b when the bottom lid lock/unlock lever 20 unlocks the bottom lid 13.

Figure 3:
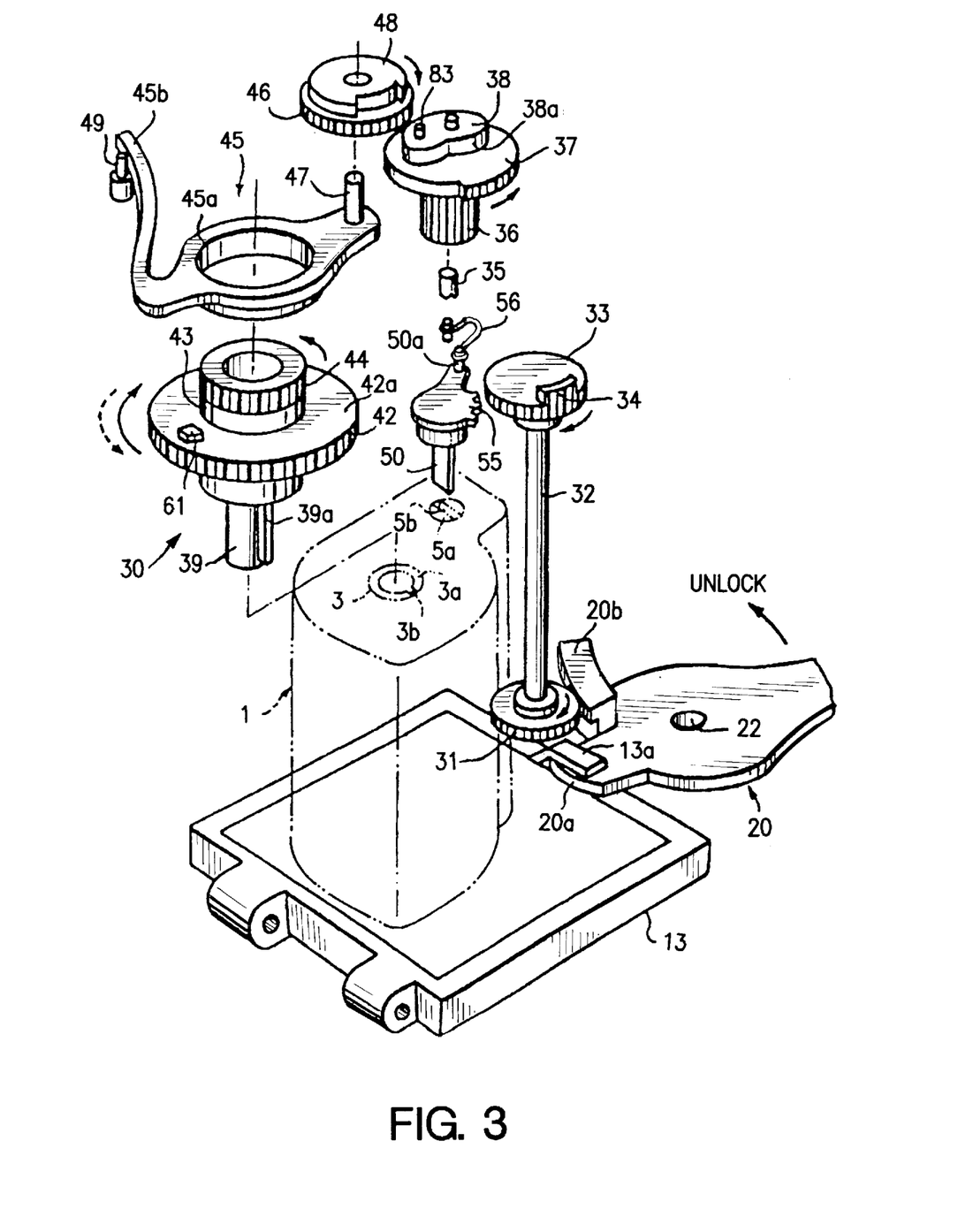
FIG. 3 is an exploded perspective view of a spool drive mechanism and a light lock door drive mechanism of the camera shown in FIG. 1.
Figure 5:
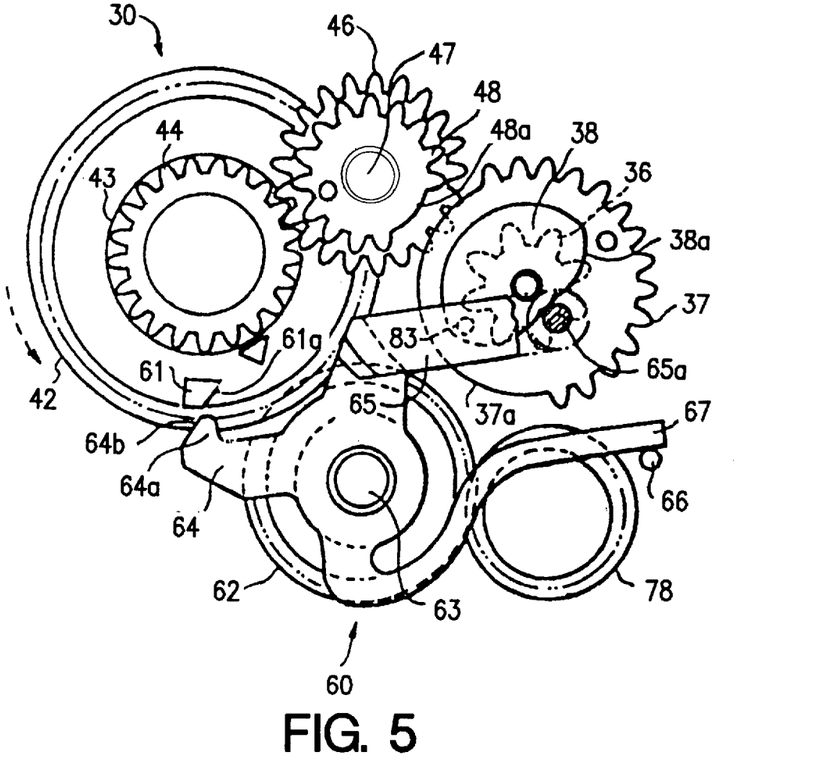
FIG. 5 is an enlarged plan view of a spool driver positioning mechanism in a position in which the spool driver is not braked.

FIG. 3 shows details of a spool positioning and light lock door driving gear mechanism linked with the bottom lid lock/unlock lever 20. As was previously mentioned, locating the indicator in the specified angular position for the indication that the filmstrip is exposed through the cross-shaped symbol window 6b is performed following unlocking movement of the bottom lid release lever 20. In addition, rotation of the light lock door 5 is caused mechanically following locking and unlocking movement of the bottom lid release lever 20. As shown in FIG. 3, the bottom lid lock/unlock lever 20 has a toothed arm 20b like a sector gear which is adjacent to the lock/unlock tongue 20a and is in mesh with one of gears 31 and 33 secured to opposite ends of a shaft 32. The top gear 33 at its specific part has extension teeth 34 with which a sector gear 55 of the light lock door driver 50. A gear 36 is supported for rotation by a shaft 35 secured to the top gear 33. As shown in FIG. 5, this gear 36 is provided with a drive partial gear 37 which has teeth partially or formed with a toothless section and a cam 38 which are coaxially fastened to the gear 36.

The motor-driven spool driver 30, which is a kind of planetary gear mechanism, has a drive shaft 39 with an elongated key 39a formed integrally therewith and engageable with the key way 3b of the cartridge spool 3. A large gear 42 is coaxially secured to the drive shaft 39 to which drive torque is transmitted from a motor 40 through a drive torque transmission gear train 41 (see FIG. 4), driving the drive shaft 39a in opposite direction, namely a normal, film unwinding direction indicated by a solid line and a reverse, film winding direction indicated by a chained line. This large gear 42 has a low cylindrical boss 43 coaxially secured thereto with a diameter approximately half that of large gear 42. A small gear 44, which works as a sun gear, is fixedly attached to the cylindrical boss 43 and has the same diameter as the cylindrical boss 43. A carrier lever 45, which has substantially the same thickness as the cylindrical boss 43 and is formed with a center bore 45a having substantially the same diameter as the cylindrical boss 43, is snugly fitted onto the cylindrical boss 43. The carrier lever 45 is formed with arms extending in diametrically opposite directions. One of the diametrically extending arm at its end is provided with a gear 46, which works as a planet gear, pivoted on a pivot shaft 47 for rotation and in mesh with the small gear 44. The carrier lever 45 is formed as a plastic part integral with the planet gear 46 and the pivot shaft 47. Consequently, the gear 46 rotates about the pivot shaft 44 and around the small gear 44 driving the small gear 44. These small sun gear 44 and planet gear 46 are the same in diameter as each other and the gear ratio between them is 1:1.

A driven partial gear 48, which has partially teeth, or is formed with a toothless section, is driven by the drive partial gear 37 as a drive gear, and is coaxially secured to the planet gear 46. These partial gears 37 and 48 have such a mutual positional relation as to locate the drive partial gear 37 with a semi-circular arcuate cutout 37a as a toothless section opposite to the periphery of the driven partial gear 48 when the bottom lid lock/unlock lever 20 is in the lock position where the bottom lid 13 is locked in the closed position or in the unlock position where the bottom lid 13 is released, placing the partial gears 37 and 48 out of engagement with each other in spite of angular positions of the driven partial gear 48 as shown in FIG. 5. Consequently, the transmission of drive torque is disconnected between the drive partial gears 37 and 48 as driving and driven gears even during the driven partial gear 48 is rotated following rotation of the spool driver 30 driven by the motor 40, and hence between the motor 40 and the bottom lid lock/unlock lever 20 through the drive partial gear 37. As shown in FIG. 5, when the spool driver 30 is in a specific angular position in which the cartridge spool 3 is located to show a color indication visible through the cross-shaped symbol window 6b, the driven partial gear 48 is positioned so as to place the circular arcuate cutout 48a opposite to the periphery of the drive partial gear 37. Consequently, even when the drive partial gear 37 is rotated following movement of the bottom lid lock/unlock lever 20 toward the unlock position, drive torque is not transmitted to the spool driver 30. Consequently, after the spool driver 30 has been put in the specific angular position once, it stays in the specific angular position regardless of any movement of the bottom lid lock/unlock lever 20. Only when the spool driver 30 is out of a specific angular position in which the cartridge spool 3 is located to show a color indication visible through the cross-shaped symbol window 6b, the drive and driven partial gears 37 and 48 are brought into engagement with each other following movement of the bottom lid lock/unlock lever 20 from the unlock position toward the lock position. As a result, drive torque caused through the bottom lid lock/unlock lever 20 is transmitted to the spool driver 30 through the gear train of gears 20b, 31, 33, 36, 37, 48, 46 and 44 in this order, rotating the spool driver 30 in the reverse direction (the film winding direction) indicated by a chained line until the cartridge spool 3 is located and held in the specific angular position for the color indication visible through the cross-shaped symbol window 6b. In this instance, because of rotation of the spool driver 30 in the film winding direction, there is no apprehension of unwinding the filmstrip out of the film cartridge 1 through the film egress/ingress slot 4.

Figure 6:
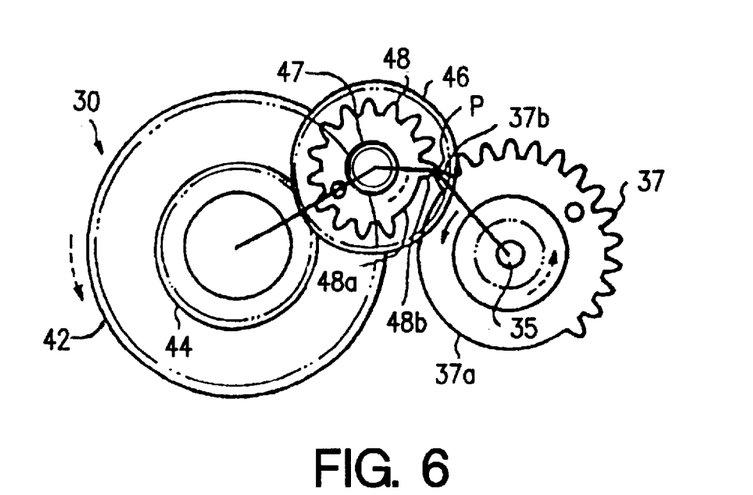
FIGS. 6 to 8 are explanatory views showing progressive interaction between drive and driven partial gears.
Figure 7:
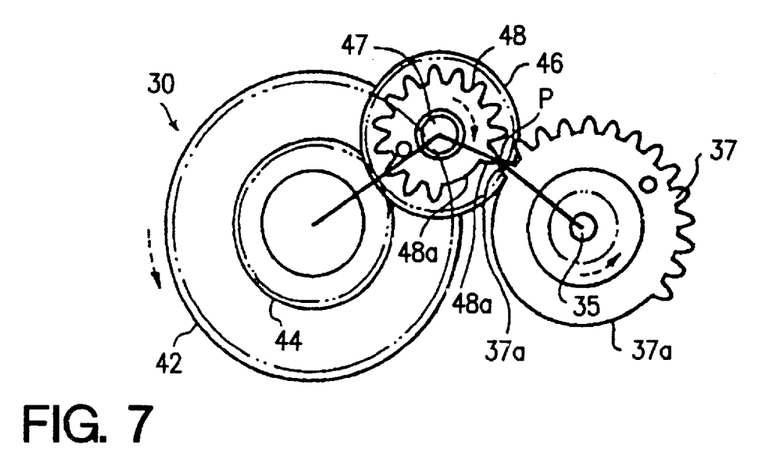
Figure 8:
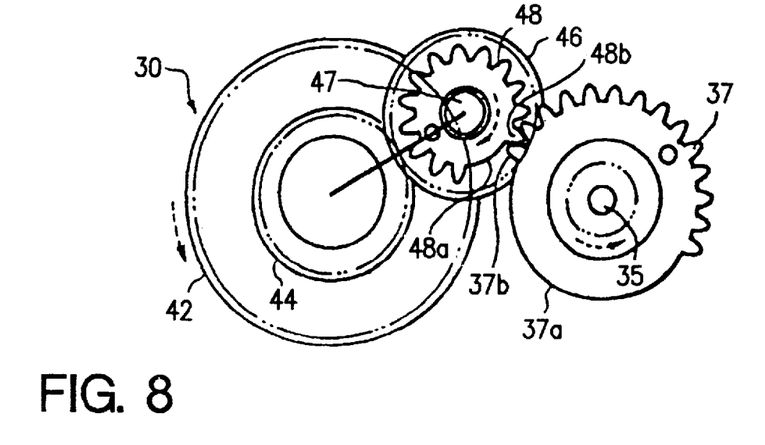
Figure 9:
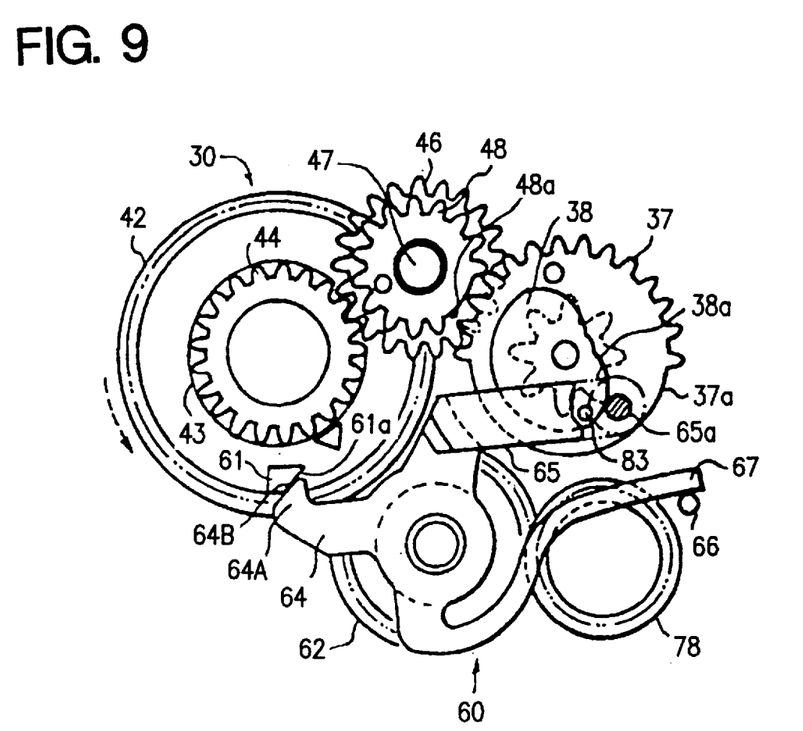
FIG. 9 is an enlarged plan view of the spool driver positioning mechanism in a position in which the spool driver is braked.

The carrier lever 45 at another arm opposite to the diametrically extending arm which supports both planet gear 46 and driven partial gear 48 is integrally formed with an elastic arm 45a. The elastic arm 45b at its end is engaged and subjected to bending stress by a stopper pin 49, urging the carrier lever 45 in such a direction as to turn it around the sun gear 44 in a clockwise direction as viewed in FIG. 5, which makes the driven partial gear 48 forced toward the drive partial gear 37. The drive partial gear 37 is made to have teeth whose number is larger by at least one than the number of teeth of the driven partial gear 48 so that the drive partial gear 37 can turn the driven partial gear 48 throughout the entire number of teeth of the driven partial gear 48 even if these partial gears 37 and 48 are arranged in a relative position in which tooth tops of their leading teeth strike against each other with the leading tooth of the drive partial gear 37 ahead of the leading tooth of the driven partial gear 48 as shown in FIG. 8. As shown in FIGS. 6 through 8 by way of example, the drive partial gear 37 has seventeen teeth, and the driven partial gear 48 has thirteen teeth. Further, the drive partial gear 37 has a pitch circle larger than the driven partial gear 48 has, and hence the drive partial gear 37 has the nominal number of teeth greater than the driven partial gear 48 has. In other words, the drive partial gear 37 is formed with the circular arcuate cutout 37a as a toothless section which is larger than the circular arcuate cutout 48a of the driven partial gear 48. This design of gear dimensions eliminates precise control of waiting position in which these driving and driven partial gears 37 and 48 are out of mesh, providing an increased degree of design freedom of the gears and mechanism related to them.

Rotational directions of the drive partial gears 37 and 48 and relative positions of the drive partial gears 37 and 48 and the sun gear 44 are designed and adapted in such a relationship as that the driven partial gear 48 makes free engagement with the drive partial gear 37 when the bottom lid lock/ unlock lever 20 is moved toward the unlock position. In other words, as viewed in FIG. 6, the operation of the bottom lid lock/unlock lever 20 to open the bottom lid 13 causes the drive partial gear 37 to rotate in a counterclockwise direction, placing the center of rotation of the driven partial gear 48 above a line connecting the centers of rotation of the drive partial gear 37 and the sun gear 44. In addition, these partial gears 37 and 44 are designed and adapted in such a relationship as that, when tooth tops of their leading teeth 27a and 44a of the partial gears 37 and 44 are brought into strike against each other, the pitch point P is located above a line connecting the centers of rotation of the partial gears 37 and 48. With this design and structure of the respective gears, rotation of the drive partial gear 37 forces the carrier lever 45 to turn around the sun gear 44 in the clockwise direction, making the driven partial gear 48 escape from engagement with the drive partial gear 37 at the pitch point and making the leading teeth 37a and 48a get over each other. These leading teeth 37a and 48a are subsequently brought into appropriate mesh with each other as shown in FIG. 8. At this time, although the drive partial gear 37 is ahead of the driven partial gear 48 by one tooth in the rotational direction as shown in FIG. 8, because the drive partial gear 37 has teeth greater in number by one than the driven partial gear 48, the drive partial gear 37 causes a turn of the driven partial gear 48 throughout the entire number of teeth of the driven partial gear 48.

Figure 4:
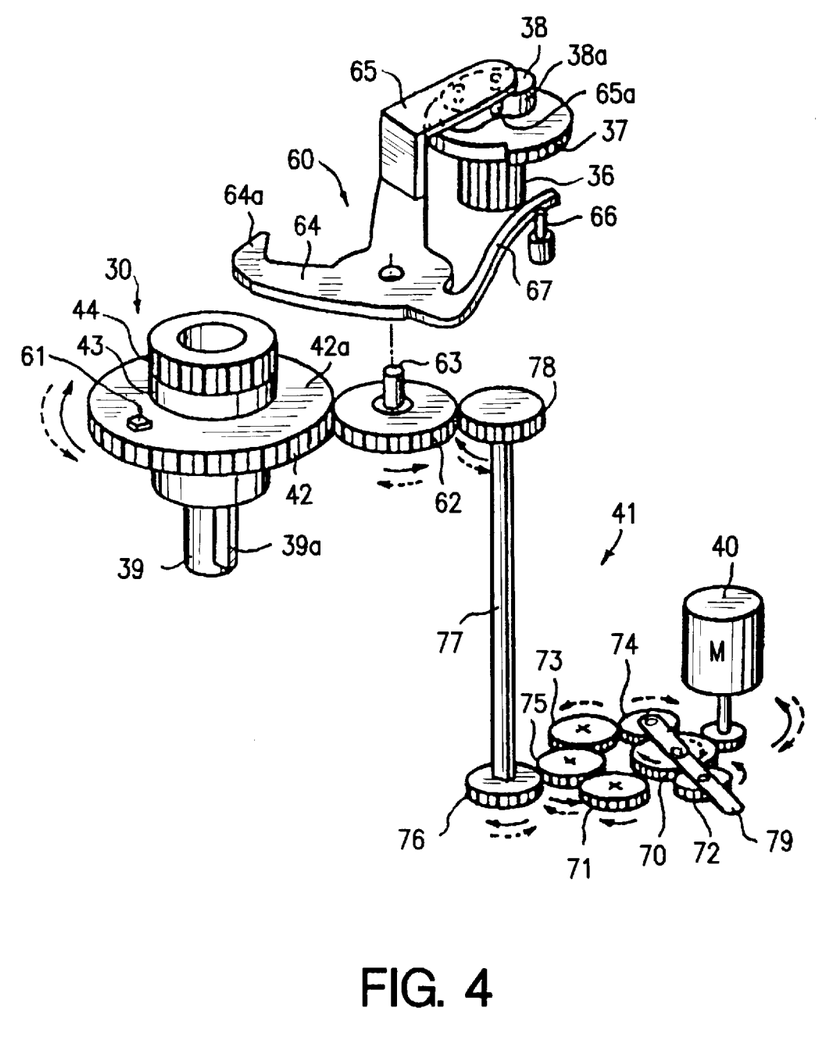
FIG. 4 is a perspective view of a drive torque transmission gear train between a motor and the spool drive mechanism.
Figure 10:
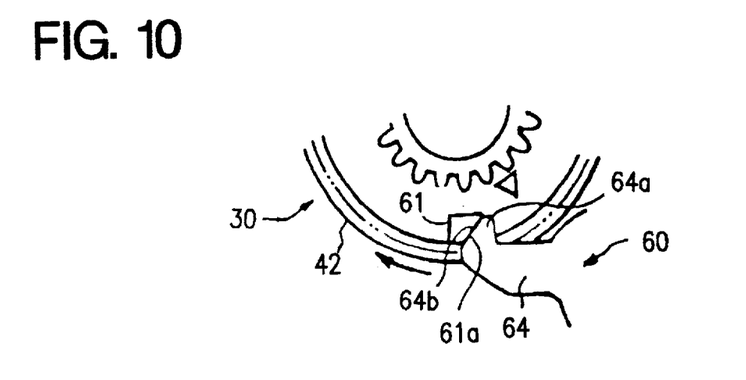
FIG. 10 is a plan view of part of the spool driver in a specific angular position.

Referring to FIGS. 4, 5, 9 and 10, the camera 10 is provided with an overrun prevention mechanism which prevents the spool driver 30 from running over the specific angular position due to the force of inertia when the spool driver 30 is driven in the reverse direction (the film winding direction) through rotation of the partial gears 37 and 48 following movement of the bottom lid lock/unlock lever 20 toward the unlock position. This overrun prevention mechanism comprises a brake lever 60 made up of a single plastic part, a stopper projection 61, which is formed on the upper side of the large gear 42 of the spool driver 30, for engaging with the brake lever 60 to stop the large gear in a specific angular position, and a heart-shaped peripheral cam 38 secured to the upper side of the drive partial gear 37 for forcing the brake lever 60 to a braking position operating together with movement of the bottom lid lock/unlock lever 20 toward the unlock position. As shown in FIG. 4, the brake lever 60 is mounted for rotation on a pivot shaft 63 which supports a gear 62 in direct mesh with the large gear 42 of the spool driver 30 which is one of various gears involved in the drive torque transmission gear train 41 between the motor 40 and the spool driver 30. As clearly seen in FIGS. 4 and 5, the brake lever 60 has a rigid arm 64 with a hook 64a formed at its free end which is engageable with the stopper projection 61, a rigid arm 65 with a cam follower roller 65a at its free end which rolls on the cam surface 38a of the peripheral cam 38, and an elastic arm 67 which is engaged at its end and subjected to bending stress by a stopper pin 66 to urge the brake lever 60 in such a direction as to turn it around the pivot shaft 63 in the counterclockwise direction as viewed in FIG. 5 and consequently press the cam follower roller 65a against the cam surface 38a of the peripheral cam 38. While the bottom lid lock/unlock lever 20 is in the lock position and in the unlock position, and hence when the drive partial gear 37 places its circular arcuate cutout 37a to face the driven partial gear 48 as shown in FIG. 4, the brake lever 60 is held in a non-braking position in which the hook 64a of the rigid arm 64 is out of the circular path of the stopper projection 61. The brake lever 60, however, turns about the pivot shaft 63 in the clockwise direction against the resilient force of the elastic arm 67, bringing the hook 64a of the rigid arm 64 into the circular path of the stopper projection 61. Consequently, the brake lever 60 is engaged by the stopper projection 61 turning in the counterclockwise direction as viewed in FIG. 9, bringing the spool driver 30 into a halt in the specific angular position. In this instance, because both of side surfaces 61a and 64b of the stopper projection 61 and the hook 64a of the rigid arm 64, or otherwise at least either one thereof, are sloped with respect to the radial direction, even if the spool driver 30 runs over the specific angular position in the reverse direction (the film winding direction), the spool driver 30 is forced to return in the normal direction (the film unwinding direction) by means of resilient engagement between the stopper projection 61 and the hook 64a of the rigid arm 61 to the specific angular position as shown in FIG. 10.

While the periphery cam 38 is secured to the drive partial gear 37 in the above embodiment, it may be integrally attached to, for instance, the bottom lid lock/unlock lever 20 or a rotational member operationally linked with the bottom lid lock/unlock lever 20. Further, the stopper projection 61 may be integrally attached to, for instance, a rotational member operationally linked with the spool driver 30.

Figure 11:
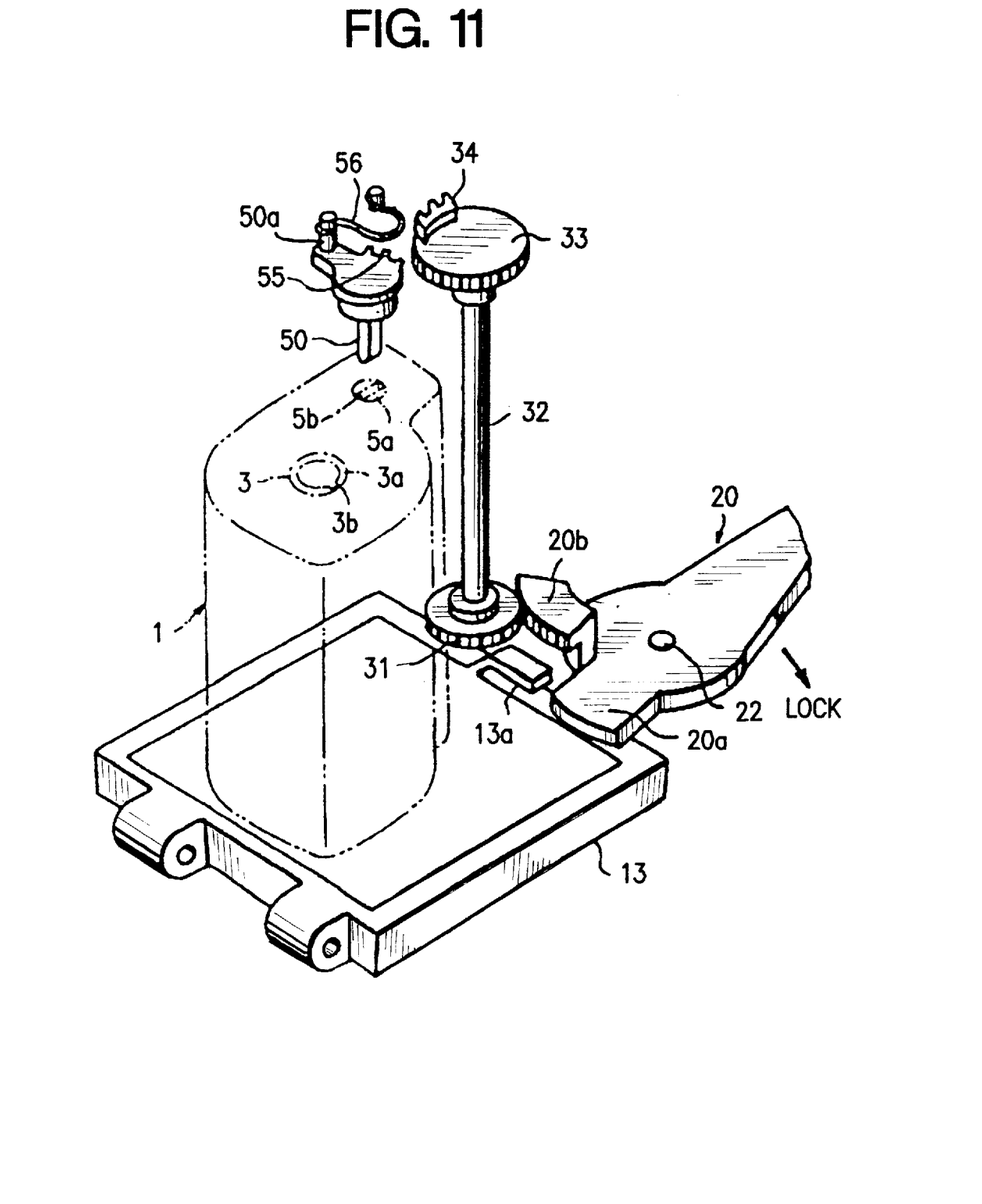
FIG. 11 is an exploded perspective view of a light lock door driver when a lock/unlock lever is moved to an unlock position.

FIGS. 3 and 11 show a light lock door drive mechanism. The light lock door driver 50, which is supported for rotation by an internal frame (not shown), has a sector gear 55 integrally formed with or fixedly attached to the top thereof and a support pin 50a secured to the sector gear 55. The sector gear 55 is engageable with the extension teeth 34 of the top gear 33. The supports pin 50a fixedly support one end of a toggle spring 56 shaped in the form of a Greek character of ohm ($\Omega$) for creating a toggle motion of the light lock door driver 50. Specifically, as shown in FIG. 3, when the bottom lid lock/unlock lever 20 is moved from the lock position toward the unlock position, it rotates the gears 31 and 33 in the clockwise direction through engagement between the toothed arm 20b and the gear 31, bringing the extension teeth 34 of the gear 33 into mesh with the sector gear 55 and then rotates it in a direction in which the light lock door 5 turns to open the film egress/ingress slot 4 of the film cartridge 1. During this rotational movement of the sector gear 55, until the sector gear 55 rotates and reaches to a specific point corresponding to a dead point of the toggle spring 56, the toggle spring 56 forces the light lock door driver 50 to a closed position in which the light lock door 5 closes the film egress/ingress slot 4 of the film cartridge 1 and keep it in the closed position as shown in FIG. 11. Consequently, the light lock door 5 remains turned in the closed position by the toggle spring 56 and closes the film egress/ingress slot 4 of the film cartridge 1 light-tightly. On the other hand, when the bottom lid lock/unlock lever 20 is moved from the unlock position shown in FIG. 11 toward the lock position, it rotates the gears 31 and 33 in the counterclockwise direction through engagement between the toothed arm 20b and the gear 31, bringing the extension teeth 34 of the gear 33 into mesh with the sector gear 55. The sector gear 55 is rotated beyond the dead point in a direction in which the light lock door 5 turns to fully open the film egress/ingress slot 4 of the film cartridge 1. The toggle spring 56 continuously forces after going across the dead point and stably holds the light lock door driver 50 in the open position.

Figure 12:
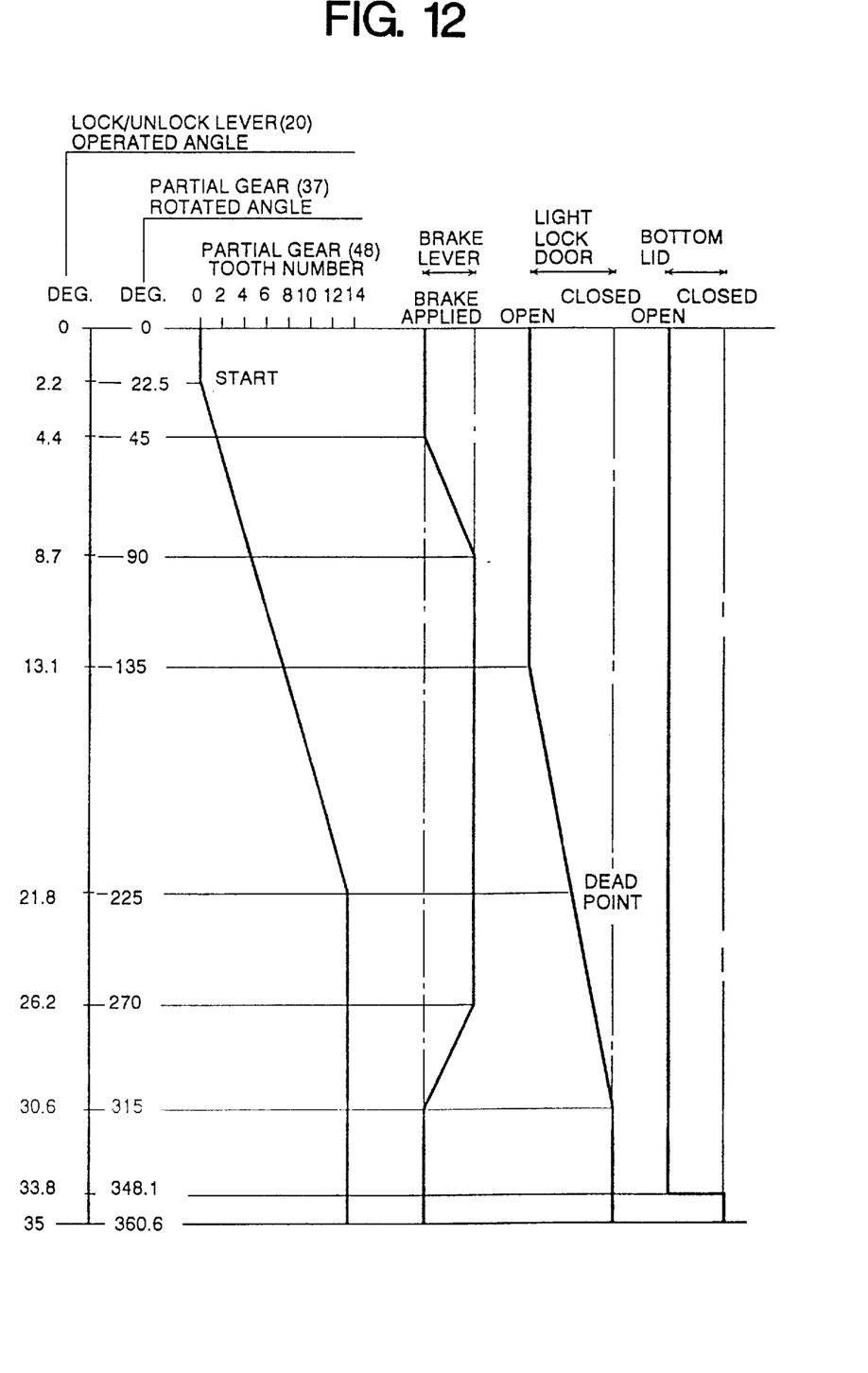
FIG. 12 is a time chart of operations of various mechanical elements when the lock/unlock lever is moved to an unlock position.

FIG. 12 shows a time chart of operation of the respective parts or elements following movement of the bottom lid lock/unlock lever 20 from the lock position to the unlock position for opening the bottom lid 13.

While, because, when the light lock door 5 is in its closed position, the cartridge spool 3 is braked lightly to prevent the indicator from shifting from the specified angular position for the indication that the filmstrip is exposed through the cross-shaped symbol window 6b, it is necessary to complete the movement of the cartridge spool 3, and hence the indicator, to the specific angular position before the light lock door 5 is turned to the closed position, nevertheless, the bottom lid lock/unlock lever 20 is allowed to have only an operative distance of movement too short to bring the light lock door 5 into the closed position following the movement of the cartridge spool 3 to the specific angular position. In order to conclude this somewhat conflicting problem, as understood from the time chart shown in FIG. 12, the bottom lid lock/unlock mechanism and its related mechanisms are designed and adapted to start operation of the light lock door driver 50 prior to completion of positioning the spool driver 30 in the specific angular position and to complete the positioning of the spool driver 30 before the sector gear 55 passes the specific point corresponding to the dead point of the toggle spring 56.

The drive torque transmission gear train 41 between the motor 40 and the spool driver 30, shown by way of example in FIG. 4, includes a plurality of gears relating to reversal in rotational direction of the spool driver 30, i.e. a sun gear 70 directly driven by the motor 40, a planet gear 72 always in mesh with the sun gear 40 and brought into mesh with an idle gear 71 by the sun gear 70 during rotation in the normal direction of the motor 40, a planet gear 74 always in mesh with the sun gear 40 and brought into mesh with an idle gear 73 by the sun gear 70 during rotation in the reverse direction of the motor 40, and a gear 75 always in mesh with both idle gears 71 and 73. These gears 71 and 73 are referred to as normal and reverse direction idle gear respectively, and these idle gears 72 and 74 are referred to as normal and reverse direction planet gears, respectively. While the motor 40 rotates in the normal direction (shown by rigid line), the drive torque is transmitted to the gear 75 through the sun gear 70, normal direction planet gear 72 and normal direction idle gear 71, and then to the large gear 42 of the spool driver 30 through a gear 76, a shaft 77, a gear 78 and an idle gear 62 in this order. In this way, the motor 40 rotates the spool driver 30 in the normal direction (the film unwinding direction) to forcibly unwind the filmstrip off the cartridge spool 5 and move it out of the film cartridge 1 through the film egress/ingress slot 4. On the other hand, while the motor 40 rotates in the reverse direction (shown by chained line), the drive torque is transmitted to the gear 75 through the sun gear 70, reverse direction planet gear 74 and reverse direction idle gear 73, and then, to the large gear 42 of the spool driver 30 through the gear 76, shaft 77, gear 78 and an idle gear 62 in this order. In this way, the motor 40 rotates the spool driver 30 in the reverse direction (the film winding direction) to forcibly rewind the filmstrip into the film cartridge 1 through the film egress/ingress slot 4. In this instance, because the motor 40 itself has a built-in reduction gear mechanism, the sun gear 70 is never driven by the normal direction planet gear 72 nor by the reverse direction planet gear 74.

In cases where the spool driver 30 is out of the specific angular position for the 5 indication, when the bottom lid lock/unlock lever 20 is moved from the lock position toward the unlock position after a termination of reverse rotation of the motor 40, the spool driver 30 is turned back to the specific angular position. The reverse rotation of the spool driver 30 is transmitted to both the idle gears 71 and 73 in the drive torque transmission gear train 41 and rotates them in the counterclockwise direction as viewed in FIG. 4. In such a case, the motor 40, which has stopped, frees the normal direction planet gear 72 from the normal direction idle gear 71 and leaves the reverse direction planet gear 74 in mesh with the reverse direction idle gear 73. Consequently, only the reverse rotation of the reverse direction idle gear 73 causes rotation in the clockwise direction of the reverse direction planet gear 74 and forces the reverse direction planet gear 74 to roll around the sun gear 70 in such a direction as to move away from the reverse direction idle gear 73. As a result, torque transmission from the spool driver 30 to the motor 40 is disconnected with an effect of preventing unlocking operation of the bottom lid 13 by means of the bottom lid lock/unlock lever 20 from being affected by the rotation of the spool driver 30 to the specific angular position after the termination of reverse rotation of the motor 40. However, considering cases where, while the camera 10 is not loaded with any film cartridge, a shutter button is operated, the motor 40 starts to rotate in the normal direction, and the drive torque is transmitted to the normal direction idle gear 71 through the sun gear 70 and normal direction planet gear 72. In this operating condition, if the bottom lid lock/unlock lever 20 is moved from the lock position to the unlock position, the normal direction idle gear 71 tries to rotate in the counterclockwise direction as viewed in FIG. 4. This causes the normal direction planet gear 72 to roll in such a direction as to be easily bitten by and between the sun gear 70 and the normal direction idle gear 71, disabling the sun gear 70 to be driven by the normal direction planet gear 72 and, consequently, arresting the bottom lid lock/unlock lever 20 from moving toward the unlock position. In order to prevent the camera 10 from encountering this problem, it is preferred to incorporate a mechanism in the camera 10 for separating the normal direction planet gear 72, which is in mesh with the normal direction idle gear 71 during normal rotation of the motor 40, from the normal direction idle gear 71 at the beginning of movement of the bottom lid lock/unlock lever 20 toward the unlock position. For this reason, the drive torque transmission gear train 41 incorporates a feature of forcible separation between these normal direction idle gear and normal direction planet gear 71 and 72.

Figure 13:
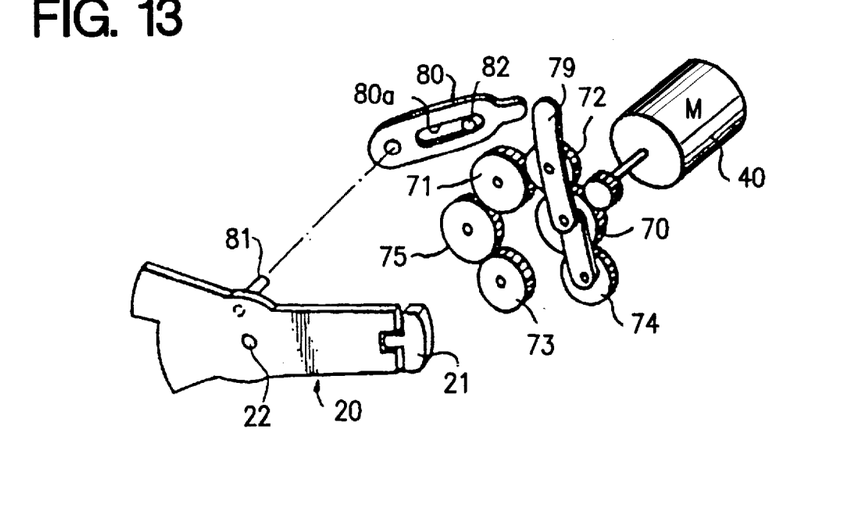
FIG. 13 is an exploded perspective view of a part of the drive torque transmission gear train.

As shown in FIG. 13 by way of example, the drive torque transmission gear train 41 includes a carrier lever 79 supporting the normal direction planet gear 72 for rotation so as to roll around the sun gear 70 and a separation arm 80 supported at one of its ends for rotation by a pivot pin 81 secured to the bottom lid lock/unlock lever 20. The carrier lever 79 has an extension extending beyond the periphery of the normal direction planet gear 72. The separation arm 80 at its another end is brought into engagement with the extension of the carrier lever 79 and forces it following movement of the bottom lid lock/unlock lever 20 toward the unlock position, forcibly separating the normal direction planet gear 72 from the normal direction idle gear 71. The separation arm 80 may be formed with a guide slot 80a for receiving a guide pin 82 therein and guided thereby for smooth and stable movement.

Figure 14:
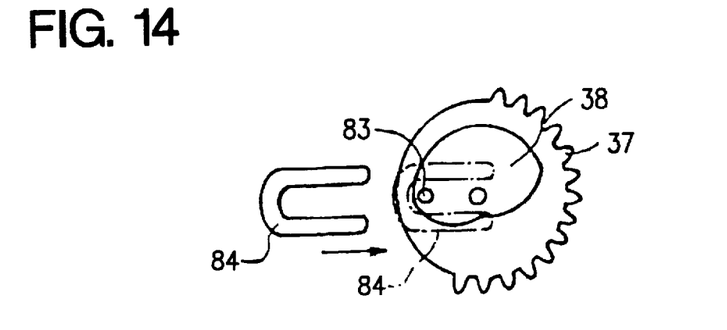
FIG. 14 is a plan view of an unlock prevention mechanism for preventing operation of the lock/unlock lever toward the lock position during film-winding.
Figure 15:
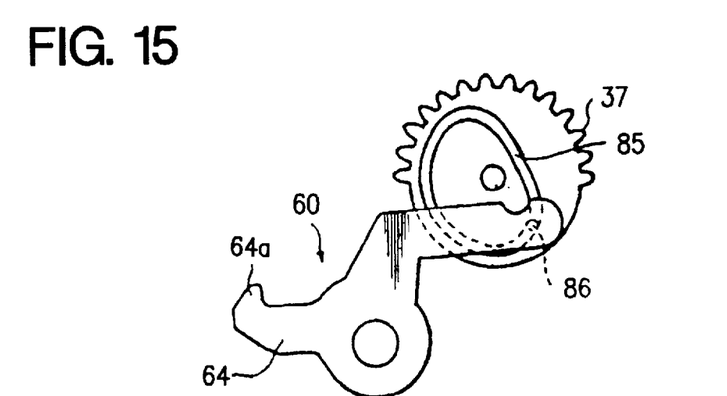
FIG. 15 is a schematic plan view of a brake lever drive cam mechanism.

Another problem possibly encountered is that, if the bottom lid lock/unlock lever 20 is operated to unlock the bottom lid 13 during rotation in the reverse direction (the film winding direction), the brake lever 60 is activated to accidentally bring the hook 64a of the rigid arm 64 into the circular path of the stopper projection 61, which can be one of causes of camera troubles. In order to eliminate such an accidental activation of the brake lever 60, an unlock prevention mechanism is installed to prevent the bottom lid lock/unlock lever 20 from being operated during reverse rotation of the motor 40 as shown, by way of example, in FIG. 14. The unlock prevention mechanism includes a stopper pin 83 secured the periphery cam 38 which, as was previously described, is rotated by means of movement of the bottom lid lock/unlock lever 20 from the lock position to the unlock position and a generally U-shaped stopper arm 84 formed integrally with, for example, a slide switch (not shown) operated to activate the motor 40 for film winding. The U-shaped stopper arm 84 is brought into engagement with the stopper pin 83 when the slide switch is operated to stop the periphery cam 38. Consequently, whenever the slide switch is operated, the bottom lid lock/unlock lever 20 is held in the lock position. In place of using the periphery cam 38 for driving the brake lever 60 joined to a rotational member, such as the periphery cam 38, which rotates following movement of the bottom lid lock/unlock lever 20 toward the unlock position, a cam slot may be used. For example, as shown in FIG. 15, the drive partial gear 37 may be formed with a cam slot 85. In this case, the brake lever 60 is provided with a cam follower pin 85 so as to place it in the cam slot 85 and has no necessity of having an urging means, such as the elastic arm 67 and stopper pin 66, for pressing the cam follower roller 65a against the periphery cam 38.

It is to be understood that although the present invention has been described with respect to a preferred embodiment thereof, various other embodiments and variants which fall within the spirit and scope of the invention are possible. Such other embodiments and variants are intended to be covered by the following claims.

What is claimed is:

1. A camera for use with a film cartridge having a roll of filmstrip wound around a cartridge spool, an indicator operationally related to the cartridge spool for providing an indication visible outside of the film cartridge that the filmstrip is exposed when the cartridge spool is at a specified angular position of rotation, and a light lock door built-in the film cartridge for opening and closing a film egress/ingress slot of the film cartridge, said camera having a cartridge receiving chamber formed with an opening through which the film cartridge is inserted and taken out, a lid for opening and closing the opening of the cartridge chamber, lock/unlock means for locking the lid in a lock position in which the lid closes the opening of the cartridge chamber and unlocking the lid in an unlock position, spool drive means driven by a reversible motor for driving the cartridge spool in opposite film unwinding and film winding directions to unwind the filmstrip off the cartridge spool and to wind the filmstrip into the film cartridge, and light lock door drive means for driving the light lock door between a closed position in which the film egress/ingress slot is closed and an open position in which the film egress/ingress slot is opened, said camera further comprising:

positioning means mechanically linked with said lock/unlock means for positioning said spool drive means in an angular position of rotation corresponding to said specified angular position of rotation of said cartridge spool following movement of said lock/unlock means from said lock position toward said unlock position; and a drive mechanism mechanically linked with said lock/unlock means for causing said light lock door drive means to drive said light lock door to said closed position following said movement of said lock/unlock means from said lock position toward said unlock position.

2. A camera as defined in claim 1, wherein, when said spool drive means is out of said angular position of rotation, said positioning means drives said spool drive means in such a direction as to cause rotation of said cartridge spool in said film winding direction and brings said spool drive means into said angular position of rotation at said beginning of said movement of said lock/unlock means from said lock position toward said unlock position.

3. A camera as defined in claim 2, wherein said positioning means includes a link means for mechanically linking said lock/unlock means and said spool drive means together, said linking means including torque transmission means for transmitting drive force from lock/unlock means to said spool drive means only when said spool drive means is out of said angular position of rotation.

4. A camera as defined in claim 2, and further comprising drive torque transmission means for transmitting drive torque from said reversible motor to said spool drive means, said drive torque transmission means including a planetary gear mechanism, and a pair of idle gears selectively brought into linkage with said planetary gear mechanism, wherein said planetary gear mechanism comprises a sun gear driven by said reversible motor, a pair of planet gears in mesh with said sun gear, one of said planet gears being brought into mesh with one of said idle gears through rotation of said sun gear when said reversible motor is changed in rotational direction to a normal direction in which said revesible motor drives said cartridge spool in said film unwinding direction from a reverse direction in which said reversible motor drives said cartridge spool in said film winding direction, and another said planet gear being brought into mesh with another said idle gear through rotation of said sun gear when said reversible motor is changed in rotational direction to said reverse direction from said normal direction.

5. A camera as defined in claim 4, and further comprising separation means for, when said one planet gear and said one idle gear remain in mesh with each other at the beginning of said movement of said lock/unlock means from said lock position toward said unlock position, forcibly separating said one planet gear and said one idle gear from each other.

6. A camera as defined in claim 1, wherein said positioning means includes a pair of drive and driven partial gears, each of which is formed with a partial toothless section, said driven partial gear placing said toothless section thereof to face said drive partial gear when said spool drive means is in said angular position of rotation, and said drive partial gear placing said toothless section thereof to face said driven partial gear when said lock/unlock means is in said lock position and in said unlock position.

7. A camera as defined in claim 6, wherein a number of teeth on said drive partial gear is greater than a number of teeth on said driven partial gear.

8. A camera as defined in claim 6, wherein a number of teeth cut away from said drive partial gear is greater than a number of teeth cut away from said driven partial gear.

9. A camera as defined in claim 6, wherein said positioning means further includes a gear coaxially attached to and rotating together with said driven partial gear, said gear functioning as a planet gear of a planetary gear mechanism and driving a sun gear of said planetary gear mechanism.

10. A camera as defined in claim 9, wherein said spool drive means has a spool drive shaft to which said sun gear is coaxially secured.

11. A camera as defined in claim 10, wherein said driven partial gear is biased against said drive partial gear and is coerced to rotate in such a direction as to effect an unrestricted easy-biting against said drive partial gear following said movement of said lock/unlock means from said lock position toward said unlock position.

12. A camera as defined in claim 11, wherein said positioning means further comprising a carrier lever coaxially mounted for rotation on said spool drive shaft, said carrier lever supporting said planet gear for rotation on a rigid arm thereof and having an elastic arm which is subjected to bending stress to urge said carrier lever so as to press said driven partial gear against said drive partial gear.

13. A camera as defined in claim 9, wherein a gear ratio between said sun gear and said planet gear is 1:1.

14. A camera as defined in claim 13, wherein said sun gear, said drive partial gear and said driven partial gear are laid out in a such a relative position that, when leading tooth tops of said drive partial gear and said driven partial gear come into contact with each other in a case that said drive partial gear drives said driven partial gear, said driven partial gear is forced back along said sun gear by said drive partial gear and then comes into appropriate mesh with said drive partial gear.

15. A camera as defined in claim 1, and further comprising overrun prevention means for preventing said spool drive means from running over said angular position of rotation due to inertial force caused while said positioning means positions said spool drive means in said angular position of rotation.

16. A camera as defined in claim 15, wherein said overrun prevention means comprises a braked member attached to one of said spool drive means and a rotational member which rotates always following operation of said spool drive means and a blocker engageable with said braked member.

17. A camera as defined in claim 16, wherein said blocker is driven by a cam attached to one of said lock/unlock means and said rotational member which rotates always following operation of said lock/unlock means.

18. A camera as defined in claim 17, wherein at least one of said blocker and said braked member has a sloped section, sliding engagement between said blocker and said braked member through said sloped section forcing said spool drive means back to said angular position of rotation whenever said spool drive means runs over said angular position of rotation.

19. A camera as defined in claim 17, wherein said blocker member comprises a cam follower in contact with said cam and an elastic arm subjected to bending stress to press said cam follower against said cam.

20. A camera as defined in claim 1, wherein said drive mechanism includes toggle means, having a dead point, for urging said light lock door drive means alternatively to said closed position before said dead point and to said open position after said dead point.

21. A camera as defined in claim 20, wherein said drive mechanism timely starts operation after said positioning means starts a positioning operation of bringing said spool drive means into said angular position of rotation and before said positioning means completes said positioning operation.

22. A camera as defined in claim 21, wherein said positioning means timely completes said positioning operation immediately before said toggle means goes across said dead point.

23. A camera as defined in claim 1, and further comprising an unlock prevention mechanism for said movement of said lock/unlock means from said lock position toward said unlock position while said reversible motor rotates in such a reverse direction as to drive said cartridge spool in said film winding direction.

* * * * *